Oct. 17, 1939.   J. M. JACOBSON ET AL   2,176,817
AIRCRAFT CONSTRUCTION
Filed Dec. 31, 1938    2 Sheets-Sheet 1
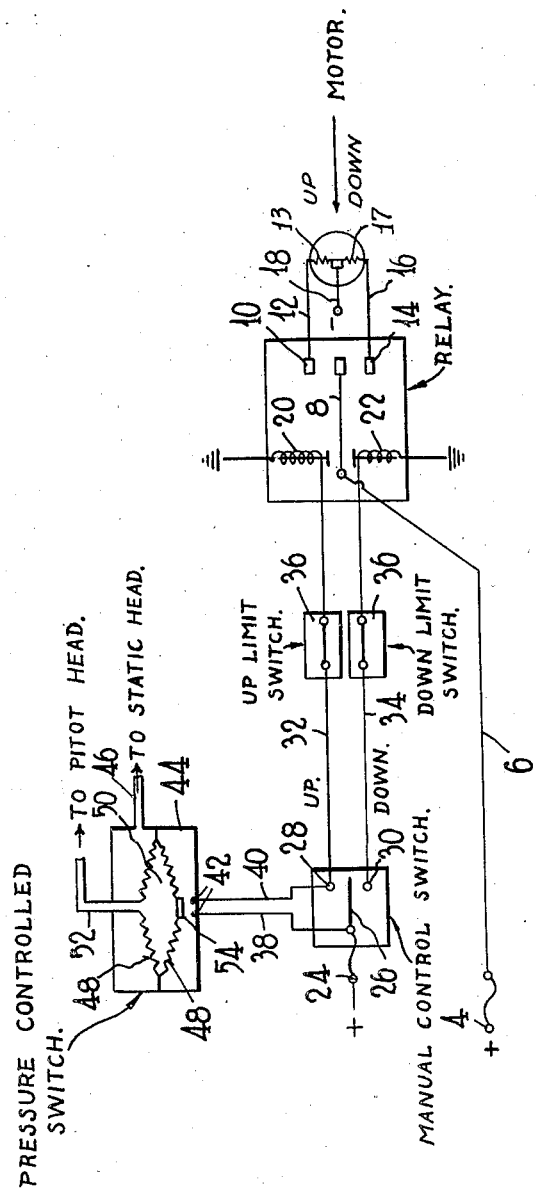
INVENTOR.
Joel M. Jacobson
Michael Watter
Harrison Beter
BY
ATTORNEY.

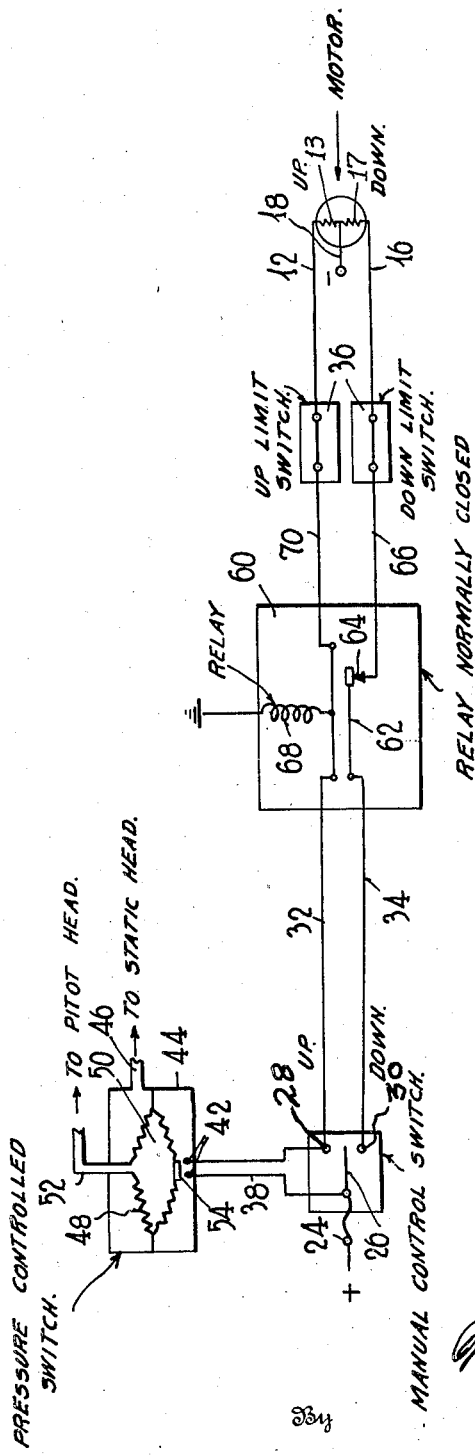

Patented Oct. 17, 1939

2,176,817

UNITED STATES PATENT OFFICE 2,176,817

AIRCRAFT CONSTRUCTION

Joel M. Jacobson and Michael Watter, Baltimore, Md., assignors to The Glenn L. Martin Company, Baltimore, Md.

Application December 31, 1938, Serial No. 248,738

6 Claims. (Cl. 244—77)

The invention relates to the automatic control of aircraft wing flaps in accordance with the speed.

In the operation of an aircraft in which the wings are provided with flaps in the known manner, it is dangerous to fly the plane above a certain critical speed when the flaps are in their lower or extended portion. The object of the present invention is to provide an electrical switch mechanism which will control the flap moving mechanism in such a manner as to raise the flap whenever the aircraft exceeds such critical speed.

A further object of the invention is to provide an electrical mechanism of a simple nature for producing this action.

A further object is to provide a novel type of speed control switch for causing the mechanism to operate to raise the flaps whenever the speed exceeds the critical.

The invention in general comprises a pressure controlled electric switch which is combined with a manual or other flap controlling mechanism in such a manner that it will automatically raise the flaps whenever the aircraft exceeds the critical speed above which operation is dangerous, by means of the increased pressure in a suitably constructed mechanism resulting from such increased speed.

Further objects and advantages of the invention will appear more fully from the following description, particularly when taken in conjunction with the accompanying drawings which form a part thereof.

In the drawings:

Fig. 1 shows diagrammatically one type of switch and electric circuit for accomplishing the result of the invention.

Fig. 2 is a diagram of a different type of mechanism.

For the operation of the flaps in the usual electrically operated device there is provided a motor 2 which upon rotation in opposite directions will raise or lower the flaps. Current is supplied to the motor from a source 4 through a line 6 and movable switch contact 8. Contact 8 may engage either a contact 10, which supplies current through a line 12 to one winding 13 of the motor of a conventional type shown, for example, in the patent to Sperry No. 1,896,805, so as to turn the same in a direction to raise the flap or retract it within the wing, or to a contact 14 supplying current through a line 16 to the other winding 17 of the motor in a direction to cause the motor to turn in such a direction as to lower the flap or move it out from the wing. The current from the motor flows from line 18 to the negative side of the circuit.

The movable switch member 8 is controlled by two relays 20 and 22. Current is supplied to these relays from a suitable source 24 through a manually operable switch 26 capable of selectively engaging two contacts 28 and 30. Contact 28 supplies current through wire 32 to relay 20 and contact 30 supplies current through wire 34 to relay 22. Obviously as switch member 26 is moved upwardly or downwardly relays 20 or 22 will be energized and movable switch member 8 will be shifted to supply current in the proper direction to the motor.

Within each of the lines 32 and 34 there is a switch 36, these two switches constituting the up-limit and down-limit switches respectively. This is a conventional provision in a device of this type, and these switches are operated by the movement of the flap when it reaches its upper or lower extreme positions, and are at that time opened. Thus it is impossible to supply current to the motor in a direction to lift the flap when the flap is in its uppermost position, or in a direction to lower the flap when the flap is in its lower position.

The present invention comprises the provision in a device of this type of a speed controlled switch which is shunted between the source of current 24 and the line 32. One wire 38 is connected to the source of current 24 and another wire 40 to the contact 28. These wires terminate in spaced contacts 42 arranged within a box 44. Air under a predetermined pressure is supplied to this box through a pipe 46.

Arranged within the box 44 are two diaphragms 48 forming between them a chamber 50. The space between the diaphragms is connected through a pipe 52 to the usual speed indicator comprising a Pitot head, or, in other words, a device arranged in such a manner that the pressure in the line increases, or at least varies, as the speed of the aircraft increases.

Assuming that a predetermined constant pressure is provided by pipe 46 in the box 44, as the pressure in space 50 varies, it is obvious that the diaphragms will move towards and from each other. When the pressure in the space 50 increases to a certain extent, contact member 54 mounted on the lower diaphragm will engage the two contacts 42 and close a circuit therebetween.

Assuming now that the airplane is in flight. When the pilot wishes to move the flap downwardly, the switch member 26 is moved downwardly and closes a circuit to the down winding 17 of the motor, so that the flap moves down. Switch 26 and contact member 8 are both normally open switches, so that when the flap moves downwardly to its desired position the pilot releases switch 26, which assumes its neutral position as does contact 8.

Now if the speed of the aircraft exceeds the critical speed above which it is dangerous to operate with the flaps down, the pressure in chamber 50 will increase sufficiently to move contact 54 to close the circuit across contacts 42. Current will then flow from the source 24 through line 38, contact 42, contact 54, contact 42, line 40, contact 28, line 32, including up-limit switch 36, to relay 20. This will raise movable contact 8 and current will flow from source 4 through line 6, contact 8, contact 10 and line 12 to the up winding 13 of the motor 2. The motor will then lift the flap or move it towards its retracted position and will continue to do so as long as the speed exceeds the critical speed, or until the flap reaches its fully retracted position, at which time the up limit switch 36 will open and the motor will of course cease to operate.

The form of the invention shown in Fig. 1 presents the possibility that the pilot might keep the flap down by holding the switch 26 so that equal amounts of current will be supplied to relays 20 and 22 and contact 8 would not be operated. Fig. 2 shows a modification in which this is impossible. The source of current 24, switch 26, contacts 28 and 30 and automatic switching mechanism including the box 44 and contact 54 are the same as shown in Fig. 1. Contacts 28 and 30 supply current to lines 32 and 34 respectively. These lines lead to a switch mechanism 60 comprising a movable contact 62 connected to line 34 and a fixed contact 64 cooperating therewith connected to a line 66; and a relay 68 connected to line 32 and to outlet line 70. Relay 68 is arranged in such a manner that when current flows through line 32 to line 70 relay 68 will be energized and will move contact 62 to open position so as to break the circuit between lines 34 and 66.

In lines 66 and 70 there are provided the up limit and down limit switches 36, and lines 66 and 70 then lead respectively to lines 16 and 12 of the motor, connected to the down and up windings 17 and 13 respectively.

The mechanism operates in general in the same manner as in Fig. 1. During normal operation, switch 26 may engage contact 30 to energize line 16 and thus cause the motor to move the flap downwardly. Line 32 is not energized and therefore contact 62 remains closed. When switch 26 is moved to engage contact 28, line 12 is energized to operate the motor to move the flap upwardly. Relay 68 lifts contact 62 and thus breaks the down circuit at this point, which of course is immaterial since the circuit is already broken at contact 30.

If, however, contact 54 of the switch 44 is in engagement with contacts 42, because the critical speed has been exceeded, current will flow through line 32 regardless of the position of switch 26 to drive the motor in the up direction. Relay 68 will move contact 62 and break the down circuit. Now even though the pilot should hold the switch 26 in the down position, current cannot flow to the down side of the motor and therefore the flap will be raised.

While we have described herein some embodiments of our invention, we wish it to be understood that we do not intend to limit ourselves thereby except within the scope of the appended claims.

We claim:
1. In a device for controlling the flap of an aircraft, comprising an electric motor connected to the flap to raise or lower the same, means to supply current to the motor to cause the same to turn in opposite directions to raise or lower the flap, said means including a source of current and a movable switch member normally connected to said source operable in different positions to control the supply of current to the motor, and means also normally connected to a source of current at the same time as said switch member and controlled by the speed of the aircraft to supply current to the motor in a direction to raise the flap when the aircraft exceeds its critical speed.

2. In a device for controlling the flap of an aircraft, comprising an electric motor connected to the flap to raise or lower the same, means to supply current to the motor to cause the same to turn in opposite directions to raise or lower the flap, said means including a movable switch member operable in different positions to control the supply of current to the motor, a switch normally operatively shunted across said switch member and adapted when closed to supply current to the motor in a direction to raise the flap, and means controlled by the speed of the aircraft to close said switch when the aircraft exceeds its critical speed.

3. In a device for controlling the flap of an aircraft, comprising an electric motor connected to the flap to raise or lower the same, means to supply current to the motor to cause the same to turn in opposite directions to raise or lower the flap, said means including a movable switch member operable in different positions to control the supply of current to the motor, a switch normally operated shunted across said switch member and adapted when closed to supply current to the motor in a direction to raise the flap, and fluid pressure means controlled by the speed of the aircraft to close said switch when the aircraft exceeds the critical speed.

4. In a device of the character described, a motor having two windings for causing the same to turn in opposite directions, a pair of fixed contacts connected to each of said windings, a first movable contact engageable with both said first pair of fixed contacts, a first source of current connected to said first movable contact, relays adapted and arranged to move said first movable contact to engage said first pair of fixed contacts, a second source of current, a second pair of fixed contacts connected to said relays respectively, a switch for selectively connecting said second source of current to said second pair of fixed contacts, and an automatic control circuit normally operatively shunted across said second source of current and one of said second pair of fixed contacts, said control circuit including means controlled by fluid under a pressure which varies with the speed of the aircraft to supply current from said second source to said contact of the second pair when the aircraft exceeds a critical speed.

5. In a device of the character described, a motor having two windings for causing the same to turn in opposite directions, a pair of fixed contacts connected to each of said windings, a first movable contact engageable with both said first pair of fixed contacts, a first source of current connected to said first movable contact, relays adapted and arranged to move said first movable contact to engage said first pair of fixed contacts, a second source of current, a second pair of fixed contacts connected to said relays respectively, a switch for selectively connecting said second source of current to said second pair of fixed contacts, and an automatic control circuit normally operatively shunted across said second source of current and one of said second pair of fixed contacts, said control circuit including a third pair of spaced fixed contacts, diaphragm means forming a space, a second movable contact carried by said diaphragm means and engageable with said third pair of fixed contacts to connect the same, and means to supply to said space fluid under a pressure which varies with the speed of the aircraft.

6. In a device of the character described, a motor having two windings for causing the same to turn in opposite directions, a pair of fixed contacts connected to each of said windings, a first movable contact engageable with both said first pair of fixed contacts, a first source of current connected to said first movable contact, relays adapted and arranged to move said first movable contact to engage said first pair of fixed contacts, a second source of current, a second pair of fixed contacts connected to said relays respectively, a switch for selectively connecting said second source of current to said second pair of fixed contacts, and an automatic control circuit normally operatively shunted across said second source of current and one of said second pair of fixed contacts, said control circuit including a chamber, a third pair of spaced fixed contacts arranged in said chamber, spaced diaphragms in said chamber forming a space therebetween, a second movable contact carried by one of said diaphragms and engageable with said third pair of fixed contacts to connect the same, and means to supply to the space between said diaphragm fluid under a pressure which varies with the speed of the aircraft.

JOEL M. JACOBSON.
MICHAEL WATTER.